(12) United States Patent
Innala

(10) Patent No.: US 6,765,505 B1
(45) Date of Patent: Jul. 20, 2004

(54) METHOD FOR DATA TRANSFER

(75) Inventor: Kari Innala, Itäsalmi (FI)

(73) Assignee: Fulcrum Laboratories AG, Zug (CH)

( * ) Notice: Subject to any disclaimer, the term of this patent is extended or adjusted under 35 U.S.C. 154(b) by 0 days.

(21) Appl. No.: 10/148,395

(22) PCT Filed: Nov. 17, 2000

(86) PCT No.: PCT/FI00/01010
§ 371 (c)(1),
(2), (4) Date: Aug. 13, 2002

(87) PCT Pub. No.: WO01/40956
PCT Pub. Date: Jun. 7, 2001

(30) Foreign Application Priority Data

Dec. 3, 1999 (FI) .............................................. 19992607

(51) Int. Cl.⁷ ................................................ H03M 7/00

(52) U.S. Cl. ........................................................ 341/50

(58) Field of Search ...................... 341/50, 51; 364/200; 395/162

(56) References Cited

U.S. PATENT DOCUMENTS

| 5,530,904 A | * | 6/1996 | Koga ........................... 710/52 |
| 5,598,580 A | | 1/1997 | Detschel et al. |
| 5,680,151 A | | 10/1997 | Grimm et al. |
| 5,748,872 A | | 5/1998 | Norman |

FOREIGN PATENT DOCUMENTS

EP          0 862 155 A3     9/1999

* cited by examiner

Primary Examiner—Brian Young
(74) Attorney, Agent, or Firm—Burns, Doane, Swecker & Mathis, L.L.P.

(57) ABSTRACT

The object of the invention is a method in data transferring in a data transfer system comprising a transmitter and a receiver and a transfer channel connecting these. It is characterizing to the invention that all data intended to be transferred is arranged and stored in mutually identical arrays at the transmitting and receiving ends and that in the method data on the location of the data or the character to be transferred in the array is transferred preferably as a time data. There can be several arrays and they can be one- or multidimensional.

20 Claims, 3 Drawing Sheets

```
t     12345678123456781234567812345678123456781234567 8
37    abcdefghabcdefghabcdefghabcdefghabcdefghabcdefgh
38    --|------|---------|----|----------------|-----|--
39      c      b         d    a                h     f
```

METHOD FOR DATA TRANSFER

BACKGROUND OF THE INVENTION

The object of this invention is a method in transferring data in a data transfer system comprising a transmitter, a receiver and a transfer channel connecting these.

Nowadays the data transferred in data transfer is most usually in digital form. The data to be transferred is coded with different coding methods. For example, when transferring textual data it is customary to use known methods in which for every character to be transferred there exists an unambiguous code. One of the most common codes is the ASCII-code having seven bits and in transferring data a string of bits corresponding to each character is sent. To speed up the transfer, different packing methods can be used. Also other methods can be used in coding, even such where the length of the code varies e.g. according to the frequency of occurrence of the character to be transferred.

Corresponding methods are also used for transfer of sound or picture. In these the sound or picture is first digitized in known ways. To boost and speed up the transfer, different compressing methods can be used before digitizing the signal and/or after it has been digitized.

SUMMARY OF THE INVENTION

The purpose of the invention is to provide a method for further reducing the amount of data to be transferred in a transfer channel compared even to compressed data. It is characterizing for the method according to the invention that all data or characters intended to be transferred are arranged and stored in mutually identical arrays in transmitting and receiving ends and that in the method data on the location of the said data or character to be transferred in the said arrays is transferred. The character set or other information used in the messages, of which the message to be transferred is composed, is stored in the arrays. In a preferred embodiment of the invention, the array containing the character set is one- or multidimensional. The elements of the arrays can be addressed unambiguously. The array can also have empty elements. The location of the character in the array in which the character set is stored can also be called the address of the character. The stored array used in the data transfer method according to the invention can in a preferred embodiment of the invention consist e.g. of unambiguously addressable data contained in a computer memory or of a defined part of such data. The arrays used in the data transfer method according to the invention can also be stored in means which can be brought into connection with the equipments in the transmitting and receiving ends for coding and/or decoding the characters to be transferred.

In a preferred embodiment of the invention, the location of the character or data in the array containing the character set is expressed as a time data counted from the starting moment of the reading of the array, when all elements of the array are scanned in a predetermined order with a constant addressing rate starting from a predetermined element. In another preferred embodiment of the invention, the character set comprising of the data or characters to be transferred is placed in two or more one- or multidimensional arrays, each being given an own unambiguous identifier, the address of the array. In this case the location of the data or the character, i.e. the address of the data or character, consists of the address of the array containing the character and of the location, i.e. of the address, of the character in the array. In a preferred embodiment of the invention both the data on the array in which the data or the character to be transferred is stored and the data on the location of the data or the character to be transferred in the said array are transferred.

When using the method according to the invention, the message to be transferred consists preferably of unambiguous characters, like for example when transferring textual data, of digits, letters, special characters and control characters. In the conventional data transfer the characters are first coded in an appropriate way and the codes corresponding to the characters are sent through the transfer channel from the transmitter to the receiver. The characters coded in an appropriate way composing the message are sent sequentially either as a continuous string or the message is sent in appropriate "packets" matched to the data transfer channel. When transferring textual data, in the coding of the characters is often used e.g. the so-called ASCII-code having seven bits, with which 127 different characters can be presented.

According to the invention, all the characters intended to be transferred, of which the messages to be transferred are composed, form a character set, which is stored in a one- or multidimensional array in a defined order. The order of the characters in the array is preferably the order of the decimal numbers corresponding to their representation with seven bits. The characters can be placed in another preferred embodiment of the invention to the array in such a way that the order of the data or the characters to be transferred is the order of their frequency of occurrence in the messages. The character set contains in a preferred embodiment of the invention special characters and control characters needed in the processing of the message.

If the message to be sent consists e.g. only of numbers, an array is used which contains only the digits 0–9 and characters corresponding to possible special and control characters. The array is then smaller than the array corresponding to the complete ASCII character set.

In addition to or instead of the aforementioned e.g. ASCII-coded individual characters, the character set can in a preferred embodiment of the invention contain character strings composed of several characters. The string contained by the element of the array, when transferring textual data, can be a whole word, a sentence, a part of them, or a whole document consisting of several pages, or a reference to any aforementioned character string. It is essential that the location of the element in the character set and the content of the element are identical both in the transmitting end and the receiving end.

According to the invention, in a corresponding way can also be proceeded in transferring other than textual data. The element of the array can be a coded part of a sound, a picture, a video picture, or a combination of these, or an entity, or a reference to such e.g. in the form of a memory address or in the form of an address of a webpage, a website, or a part of such, e.g. as an URL-address Depending on the sort of the messages to be transferred, different character sets are preferably used. Before transferring the message, the transmitting and receiving ends are brought to select from the possible available character sets a common character set best applicable to the transfer of the message. The said character sets are thus stored in appropriate storing means in the transmitting and receiving ends in such a way that the character set used in the transfer is unambiguously identifiable and can be taken into use for the duration of the transfer. The character sets used in the transfer of the message or messages can be transferred in a preferred embodiment of the invention by using the method according to the invention. The character set can be transferred as a separate message or as a part of the message to be transferred, preferably e.g. before transferring the actual message.

The data transfer system using the method comprises both in the transmitting and receiving ends an equipment comprising at least means for storing the array or arrays containing the character set, means for addressing the array and/or an element of the array, means for synchronizing the operations such as a clock, and necessary means for controlling the operation of the equipment. The transmitting end is in addition provided with means for receiving the data or character of the message from a sending device such as e.g. a keyboard, or from a computer memory, or a computer display, and means for storing at least temporarily this character to be transmitted, means for connecting the transmitting equipment to the transfer channel and means for sending the data corresponding to the character to the transfer channel. Correspondingly the receiving end is provided with means for connecting the receiving equipment to the transfer channel, means for receiving data coming from the transfer channel, means for storing at least temporarily the element read from the array corresponding to the received data and means for forwarding the element corresponding to the received data to the processing means such as e.g. a display device, a printer, or a computer memory.

In the memory of the equipments in the transmitting and receiving ends is stored at least one array containing at least one character set, arrays or multidimensional arrays which contain all characters used in composing the messages to be transferred including different control characters. The arrays are mutually identical with regard to their content and order and they can also contain empty elements. When the characters, which the message to be transferred is composed of, are placed in several arrays or when at the transmitting and receiving ends several arrays are available and selectable, both the data on the array in which the character intended to be transferred is stored and the data on the location of the character in the array are transferred in a preferred embodiment of the invention. In a preferred embodiment of the invention, the data on the array, in which the character intended to be transferred is located, is expressed as a time data counted from the start of the addressing of the arrays, when all the arrays are addressed in a predetermined order sequentially with a constant addressing rate starting from a predetermined array.

According to the invention after creating the transfer connection the sending of the desired message takes place described as follows in a simplified way. The equipment in the transmitting end is provided with means for controlling the addressing means of the element to address the elements of the array. The addressing of the elements is synchronized preferably to the clock of the equipment in such a way that the elements are addressed in sequence cyclically at the rate determined by the clock. The addressing can also be done in another appropriate way, e.g. by using a mathematical formula or algorithm or in another way which carries out the cyclical addressing. The addressing of the elements is started preferably always from the same element, preferably from the first element in the array. In a preferred embodiment of the invention, the element from which the addressing is started is sent as a separate message or as a part of the message to be transferred. In another preferred embodiment of the invention, the order in which the elements are addressed is transferred as a separate message or as a part of the message to be transferred. Still in another preferred embodiment of the invention which uses several arrays, the addressing order of the arrays and/or the array from which the addressing of the arrays is started, is sent as a separate message, as a part of the message to be transferred, or combined to another message which informs on the addressing order of the elements of the array, the element from which the addressing is started and/or the rate of the addressing.

When in scanning the array that element is addressed, which corresponds to the character which is desired to be sent, to the transfer channel is sent the data at that moment according to the protocol used in the channel, e.g. in the form of a pulse. The receiving end is provided with corresponding means which scan the identical array stored in the means therein in the same order as in the transmitting end one element at a time, synchronized to the synchronizing means of the equipment of the receiving end, such as clock. The addressing means in the transmitting and receiving ends are brought preferably e.g. in connection with the creation of the transfer connection to address the same element, preferably the first element in the array. The clocks of the equipments in the transmitting and receiving ends are preferably synchronized mutually in such a way that the means of the equipments of the transmitting and receiving ends always address at the same moment at the same element of the array. In a preferred embodiment of the invention the clocks or corresponding synchronizing means of the transmitting and receiving ends are synchronized to each other at least at the start of the data transfer preferably as a part of the starting procedures in the creation of the transfer connection. The clocks of the transmitting and receiving ends can be synchronized to each other preferably also during the transmission of the message. For synchronizing the clocks in a preferred embodiment of the invention another transfer channel can be used or the clocks can be synchronized to a common signal source, which is preferably also exterior with regard to the transmitting and receiving equipment, e.g. to an atomic clock or a corresponding time signal source.

The synchronizing of the transmitting and receiving ends can in a preferred embodiment of the invention be relative in such a way that the ratio of the clock frequencies of the synchronizing means of the transmitting and receiving ends is constant.

It is characterizing to the invention that instead of the character or data to be transferred or the code corresponding to them, an item of data is sent on that, when the pointer is in the array at the element corresponding to the desired character. When in the receiving end the array is scanned with the same rate starting from the same point, the pointer of the receiving end points to the element, which corresponds to the character, which was meant at the transmitting end. The data contained in the element addressed by the addressing means of the receiving end, e.g. the code of the character to be transferred, can be transferred to the processing means of the receiving end for storing the character and/or presenting it.

The message to be transferred and/or the associated data on the character set used and/or the way of addressing in use, such as the starting point, the order and/or the rate can be stored in a preferred embodiment of the invention in the storing means of the equipments of the transmitting and/or receiving ends whereby the message can be sent later than the message is created and/or correspondingly decoded later than the message is received.

According to the invention, the address of the element corresponding to the certain data or character, the location of the element in the array, is expressed a time data in relation to the starting moment of the reading of the array. This time data is in a preferred embodiment of the invention in relationship to the rate with which the array is scanned. In this embodiment the addressing means move to point in the agreed order the next element always when the addressing means receive a signal from the synchronizing means, e.g. a clock pulse. In a preferred embodiment of the invention the addressing means move to point after the last element in the array to the first element of the array.

In a preferred embodiment according to the invention in addition to the coded data or character, as time data is also sent data on the addressing rate of the arrays and/or the elements of the array used in the transmitting end preferably in connection with the creation of the transfer connection or during the transfer of the message preferably e.g. when starting the addressing of the array. Also this information is sent preferably as a time data, e.g. as two or more clock pulses. The receiving end is provided with means for detecting and processing this rate of addressing to a control signal for addressing means of the receiving end. The addressing rate signal can also preferably be sent through another transfer channel between the transmitting and receiving ends. By using the addressing rate, it can be ensured that the elements of the arrays in both transmitting and receiving ends are scanned with the same rate.

The method according to the invention can be used in data transfer using both wired transfer channels and wireless transfer channels.

BRIEF DESCRIPTION OF DRAWINGS

The invention is described in more detail in the following with an example by using a drawing, where FIG. 3 shows a time diagram of the way of the transfer according to the method and FIG. 4 shows another time diagram of the way of the transfer according to the method.

In figures like reference numbers are used for like parts.

DESCRIPTION OF PREFERRED EMBODIMENTS

Figure 1:
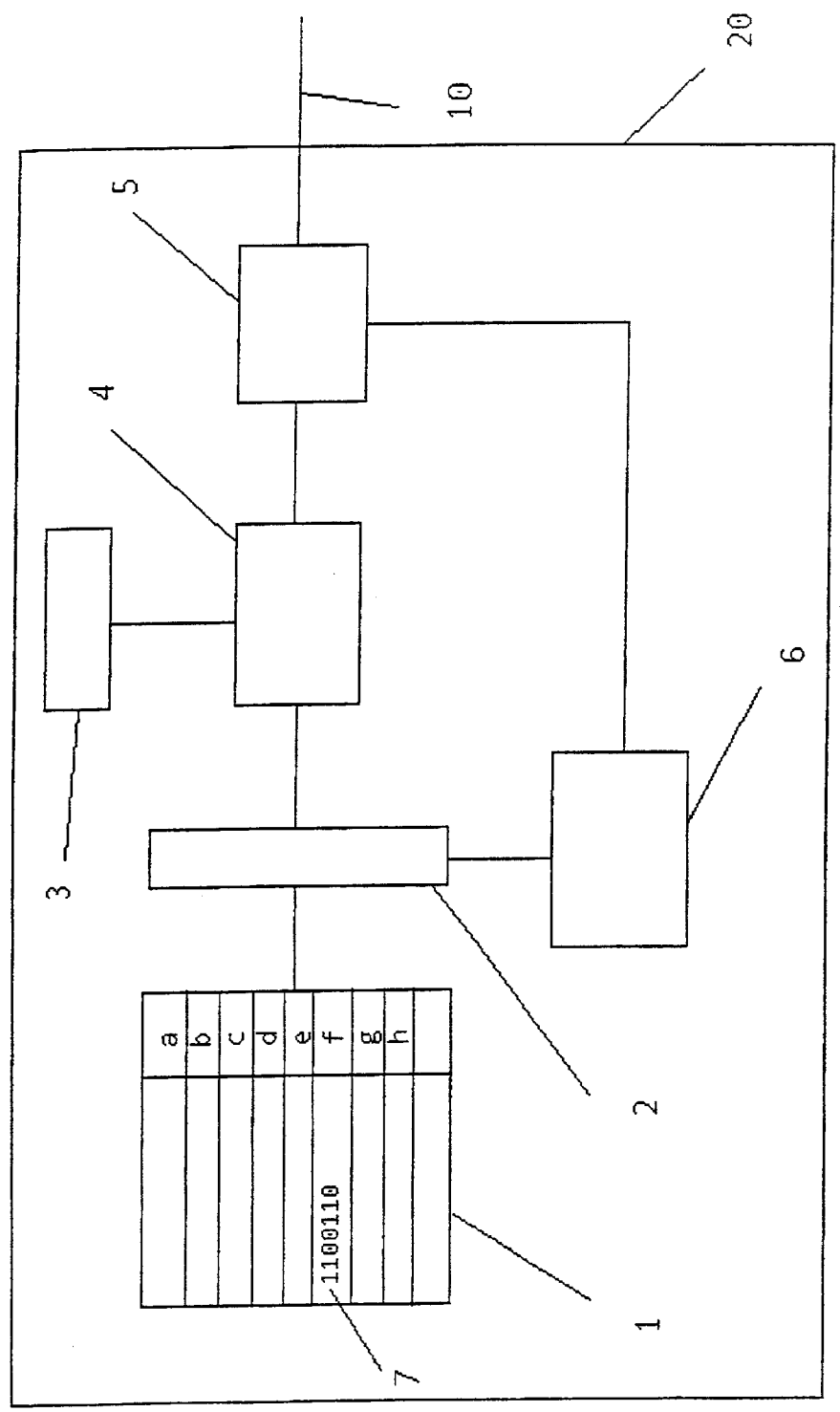
FIG. 1 shows the basic arrangement at the transmitting end according to the invention.

In FIG. 1 is shown the basic arrangement at the transmitting end simplified. The transmitter used in the transfer of data is referenced with reference number 20. In this FIG. 1 the array containing the character set, which is used for composing the messages, is stored in storing means, such as memory, and referenced with reference number 1. This character set has for the simplification only eight characters, letters a–h. An element of the array is referenced with reference number 7. In FIG. 1 of the elements of the array the content of only that element which contains the ASCII-code "1100110" corresponding to the letter "f" is shown. The addressing means, which can point at any element of the array, are shown with reference number 2. The desired message is inputted with means referenced with reference number 3, in this example one character at a time. Preferably the means 3 give the ASCII-code of the character desired to be sent. With reference number 4 is shown the comparison means, which compare the ASCII-code of the character inputted with inputting means 3 and intended to be transferred to the content of the element pointed by the addressing means 2, which is also an ASCII-code. The synchronizing means 6, e.g. a clock pulse generator, is used to control the addressing means 2 in such a way that the addressing means 2 point sequentially each element 7 of the array 1 starting from the first element of the array 1, which is in the example character "a". For simplification it is assumed in the following that the addressing means 2 move to point the next element of the array 1 at the next clock pulse. When the addressing means 2 have pointed at the last element in the array, which in this example is "h", they move at the next moment determined by the clock signal, generated by the synchronizing means 6, to point at the first element of the array. The clock pulses given by the synchronizing means 6 are also connected to the transmitting means 5. In a preferred embodiment of the invention the transmitting means 5 send to the transfer channel 10 a signal before the first element 7 is addressed as a signal of starting the scanning of the array 1. When the comparison elements 4 observe that the signal given from the inputting means 3 is the same as the element 7 pointed by the addressing means 2, the output signal of the comparison means 4 connected to the transmitting means 5 detects this and as a consequence thereof the transmitting means 5 send to the transfer channel 10 the corresponding signal. The transmitting moment of the signal to be sent to the transfer channel 10 corresponds thus in the time dimension the location of the character in the array. If in this simplified example the character intended to be transmitted had been "a", a signal would have been sent to the transfer channel 10 at the first clock pulse after the start. If the desired signal had been "f", the signal would have been sent to the transfer channel 10 at the sixth clock pulse.

Figure 2:
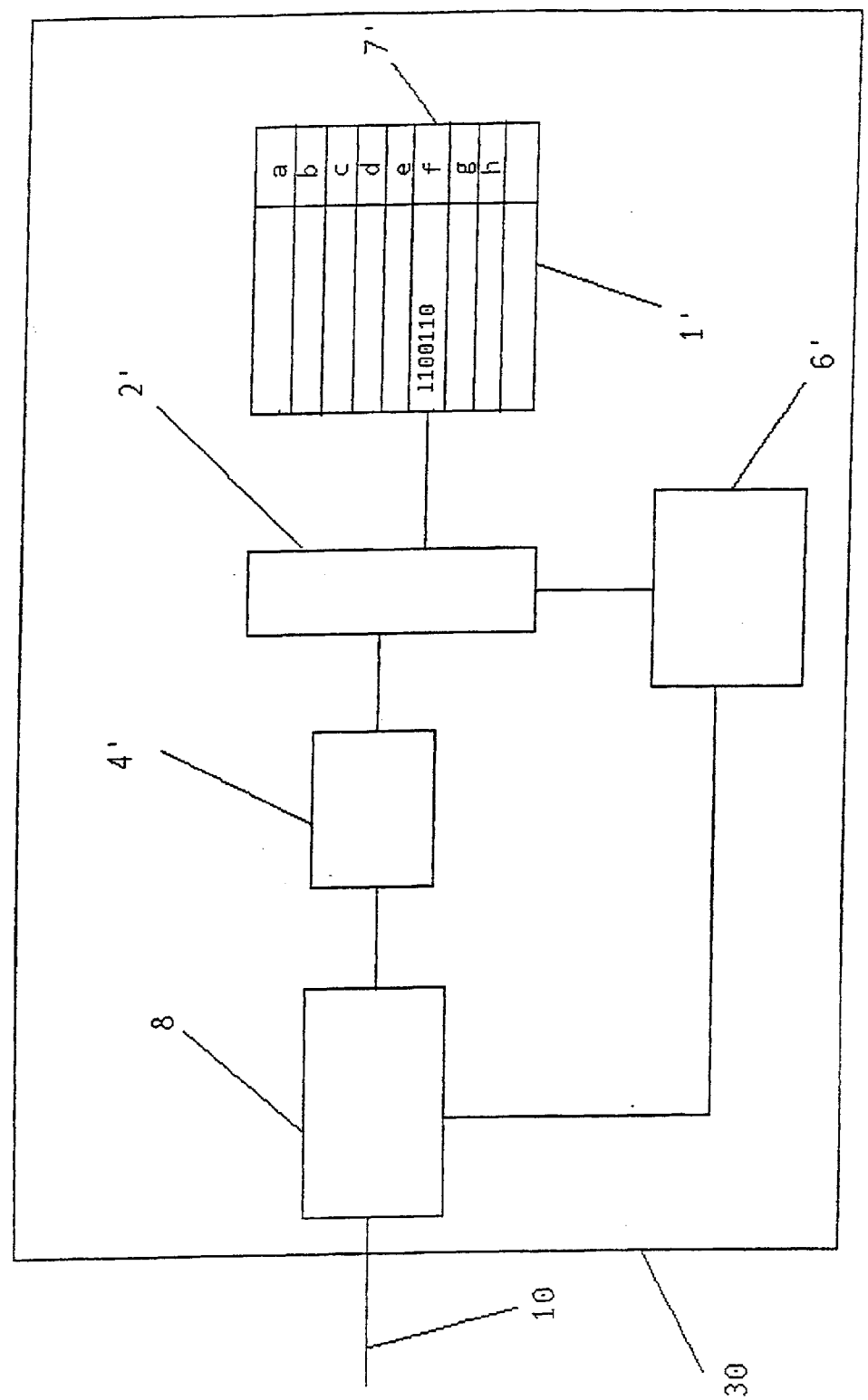
FIG. 2 shows the basic arrangement at the receiving end according to the invention.

In FIG. 2 is shown the basic arrangement in the receiving end associated to the data transfer method according to the invention simplified, wherein the receiver is referenced with reference number 30. The receiving means 8 are connected to the transfer channel 10. The receiving end is provided with an array 1', which is identical to the array 1 at the transmitting end, and the element of which is referenced by reference number 7'. Further the receiving end is provided with synchronizing means 6' corresponding to the synchronizing means 6 at the transmitting end. In a preferred embodiment of the invention, the synchronizing means 6 and 6' have the same frequency and they are in addition synchronizable to each other e.g. with suitable signals which are transmitted through the transfer channel 10. In another preferred embodiment of the invention the synchronizing means 6 and 6' are synchronized to the same external signal. In the FIGS. 1 and 2 are not shown the means needed for the mutual synchronizing of the synchronizing means or the means needed for the synchronizing to the common external synchronizing. The receiving end is provided with addressing means 2' for addressing the elements 7' of the array 1' in the same way cyclically in sequence as at the transmitting end. The addressing means 2 of the transmitting end and the addressing means of the receiving end 2' are synchronized to each other in such a way that they point at the same time at the same element of the array in order. In this simplified example both addressing means 2 and 2' start the addressing of the elements of the array from the first element, which in this example is "a". The addressing means of the receiving end point in order sequentially the elements 7' of the array 1' in the same way as at the transmitting end. The incoming moment of the signal coming from the transfer channel 10 is compared with the comparison means 4' to the addressing moments of the addressing means 2' of the receiving end. The content of that element 7', which is pointed by the addressing means 2' when the signal comes from the transfer channel 10, corresponds to the data intended to be transferred. The means at the receiving end, which are not shown in the drawing, transfer the data contained in this addressed element, in this example the ASCII-code, to the processing elements of the receiving end for storing and/or displaying.

In FIG. 3 is shown the operation of the transfer method according to the invention in the time dimension. In the example shown in the figure, the messages to be sent are composed of eight characters, letters a–h. These characters or the codes corresponding to these characters are placed in an array having eight elements. In the example this array is constantly scanned cyclically starting from the first element "a" and after the last element of the array "h" the reading of the array is started from the beginning. In the row, which is marked with t, the numbers 1–8 express the moment of time counted from the starting moment of the reading of the array at each scan. On the row 37 is shown the character, which is pointed by the addressing means at each moment. In row 38 the vertical lines show the signals to be sent to the transfer channel. In FIG. 3 is shown the transmitting of the character string "cbdahf". When the character "c" is wanted to be sent, the signal is sent to the transfer channel at the moment 3. The next signal is sent to the transfer channel at the moment 2 of the next scan, which corresponds to the transmitting of the character "b". It is observed from the example that to the transfer channel is sent only one bit for each character to be sent. The transmitting of the ASCII-code of the letter "c" would mean transmitting seven bits.

In FIG. 4 the operation of the method according to the invention is shown in a preferred embodiment. In this embodiment the messages to be transmitted are composed of eight characters stored in an array, e.g. of letters a–h. The equipment using the data transfer according to the method is provided with means for synchronizing the transfer of the pulses to be transmitted, e.g. the clock pulses, to the transfer channel. In the example shown in FIG. 4 at the beginning of each scanning of the array, a synchronizing signal is sent, which consists e.g. of two clock pulses. In the row 43 the clock pulse string is shown schematically. The numbers on the row 41 are the numbers of the clock pulses associated with the scanning of the array. Before the actual scanning of the array, two clock pulses are sent for synchronizing the transmitting and receiving equipment. These pulses are marked with letter "s" on the row 42. The letters "a"–"h" on the row 42 describe the scanning of the character set stored in the array. On the row 44 is shown the composing of the message to be transferred of two synchronizing pulses "s" and of the pulse pointing out the character intended to be sent. In the example shown in FIG. 4, during the first scanning period the letter "d" is sent, during the second period the letter "b" and during the third period shown the letter "a".

What is claimed is:

1. A data transfer method in transferring data in a data transfer system comprising a transmitter (20), a receiver (30) and a transfer channel (10) connecting these, characterized in that all data or characters (7, 7') intended to be transferred are arranged and stored in mutually identical arrays (1, 1') in transmitting and receiving ends and that according to the method data on a location of the said data or character (7, 7') to be transferred in the said arrays (1, 1') is transferred as a time data counted from the starting moment of the reading of the array (1, 1'), when all elements (7, 7') of the array (1, 1') are scanned in a determined order with a constant addressing rate starting from a determined element, or according to a mathematical formula or an algorithm.

2. Data transfer method according to claim 1, characterized in that the order of the data or the characters (7, 7') to be transferred in the array (1, 1') is the order of their frequency of occurrence in the messages.

3. Data transfer method according to claim 1, characterized in that the data or the characters (7, 7') to be transferred are placed in two or more arrays (1, 1') and that in the method both the data on the array (1, 1'), in which the data or the character (7, 7') to be transferred is stored, and the data on the location of the character (7, 7') in the said array (1, 1') is transferred according to a mathematical formula or an algorithm, or as a time data counted from the start of the addressing of the arrays (1, 1'), when all the arrays are addressed in a determined order sequentially with a constant addressing rate starting from a determined array and that the data on the location of the character (7, 7') in the array (1, 1') is expressed as a time data, counted from the starting moment of the reading of the array (1, 1'), when all the elements (7, 7') of the array (1, 1') are scanned in a determined order with a constant addressing rate starting from a determined element, or by means of a mathematical formula or an algorithm.

4. Data transfer method according to claim 1, characterized in that in addition to that data which expresses the array (1, 1') in which the data or the character (7, 7') to be transferred is stored and in addition to that data which expresses the location in the array (1, 1') of the data or the character (7, 7') to be transferred, the data on the addressing rate used for addressing of the arrays (1, 1') and/or the elements (7, 7') of the arrays (1, 1') is transferred.

5. Data transfer method according to claim 4, characterized in that the data on the addressing rate of the arrays (1, 1') and/or on the addressing rate of the elements (7, 7') in the array (1, 1') is transferred as a time data or by means of a mathematical formula or an algorithm.

6. Data transfer method according to claim 4, characterized in that in addition to the data disclosing the array (1, 1'), and in addition to the data disclosing the location of the element (7, 7') in the array (1, 1'), the data on the reading order and the data on the starting point of the reading of the arrays (1, 1') and the elements (7, 7') in the arrays (1, 1') is transferred.

7. Data transfer method according to claim 1, characterized in that the data on the addressing rate and/or the data on the reading order and/or the data on the starting point of the reading of the arrays (1, 1') and/or the elements (7, 7') in the arrays (1, 1') is transferred as a separate message.

8. Data transfer method according to claim 1, characterized in that the data on the addressing rate and/or the data on the reading order and/or the data on the starting point of the reading of the arrays (1, 1') and/or the elements (7, 7') in the arrays (1, 1') is transferred as a part of the message containing the data disclosing the array (1, 1') and/or the location of the element (7, 7') in the array (1, 1').

9. Data transfer method according to claim 1, characterized in that before the data disclosing the array (1, 1') and before the data concerning the location of the element (7, 7') in the array (1, 1'), the data on the addressing rate and/or the data on the reading order and/or on the starting point of the reading of the arrays (1, 1') and the elements (7, 7') in the arrays (1, 1') is transferred.

10. Data transfer method according to claim 7, characterized in that the data on the reading order of the arrays (1, 1') and the elements (7, 7') in the arrays (1, 1'), and/or the starting point of the reading of the arrays (1, 1') and the elements (7, 7') in the arrays (1, 1'), and/or the addressing rate of the arrays (1, 1') and the elements (7, 7') in the arrays (1, 1') is transferred as a time data, or by means of a mathematical formula or an algorithm.

11. Data transfer method according to claim 2, characterized in that the data or the characters (7, 7') to be transferred are placed in two or more arrays (1, 1') and that in the method both the data on the array (1, 1'), in which the data or the character (7, 7') to be transferred is stored, and the data on the location of the character (7, 7') in the said array (1, 1') is transferred according to a mathematical formula or an algorithm, or as a time data counted from the start of the addressing of the arrays (1, 1'), when all the arrays are addressed in a determined order sequentially with a constant addressing rate starting from a determined array and that the data on the location of the character (7, 7') in the array (1, 1') is expressed as a time data, counted from the starting moment of the reading of the array (1, 1'), when all the elements (7, 7') of the array (1, 1') are scanned in a determined order with a constant addressing rate starting from a determined element, or by means of a mathematical formula or an algorithm.

12. Data transfer method according to claim 3, characterized in that in addition to that data which expresses the array (1, 1') in which the data or the character (7, 7') to be transferred is stored and in addition to that data which expresses the location in the array (1, 1') of the data or the character (7, 7') to be transferred, the data on the addressing rate used for addressing of the arrays (1, 1') and/or the elements (7, 7') of the arrays (1, 1') is transferred.

13. Data transfer method according to claim 5, characterized in that in addition to the data disclosing the array (1, 1'), and in addition to the data disclosing the location of the element (7, 7') in the array (1, 1'), the data on the reading order and the data on the starting point of the reading of the arrays (1, 1') and the elements (7, 7') in the arrays (1, 1') is transferred.

14. Data transfer method according to claim 2, characterized in that the data on the addressing rate and/or the data on the reading order and/or the data on the starting point of the reading of the arrays (1, 1') and/or the elements (7, 7') in the arrays (1, 1') is transferred as a separate message.

15. Data transfer method according to claim 3, characterized in that the data on the addressing rate and/or the data on the reading order and/or the data on the starting point of the reading of the arrays (1, 1') and/or the elements (7, 7') in the arrays (1, 1') is transferred as a separate message.

16. Data transfer method according to claim 4, characterized in that the data on the addressing rate and/or the data on the reading order and/or the data on the starting point of the reading of the arrays (1, 1') and/or the elements (7, 7') in the arrays (1, 1') is transferred as a separate message.

17. Data transfer method according to claim 5, characterized in that the data on the addressing rate and/or the data on the reading order and/or the data on the starting point of the reading of the arrays (1, 1') and/or the elements (7, 7') in the arrays (1, 1') is transferred as a separate message.

18. Data transfer method according to claim 2, characterized in that the data on the addressing rate and/or the data on the reading order and/or the data on the starting point of the reading of the arrays (1, 1') and/or the elements (7, 7') in the arrays (1, 1') is transferred as a part of the message containing the data disclosing the array (1, 1') and/or the location of the element (7, 7') in the array (1, 1').

19. Data transfer method according to claim 3, characterized in that the data on the addressing rate and/or the data on the reading order and/or the data on the starting point of the reading of the arrays (1, 1') and/or the elements (7, 7') in the arrays (1, 1') is transferred as a part of the message containing the data disclosing the array (1, 1') and/or the location of the element (7, 7') in the array (1, 1').

20. Data transfer method according to claim 4, characterized in that the data on the addressing rate and/or the data on the reading order and/or the data on the starting point of the reading of the arrays (1, 1') and/or the elements (7, 7') in the arrays (1, 1') is transferred as a part of the message containing the data disclosing the array (1, 1') and/or the location of the element (7, 7') in the array (1, 1').

* * * * *